United States Patent
Meier et al.

(10) Patent No.: US 9,725,541 B2
(45) Date of Patent: *Aug. 8, 2017

(54) POLYETHYLENE COMPOSITION FOR BLOW MOLDING HAVING HIGH STRESS CRACKING RESISTANCE

(71) Applicant: BASELL POLYOLEFINE GMBH, Wesseling (DE)

(72) Inventors: Gerhardus Meier, Frankfurt (DE); Ulf Schuller, Frankfurt (DE); Diana Dotsch, Bad Krueznach (DE); Bernd Lothar Marczinke, Frankfurt (DE); Jens Wiesecke, Zwingenberg (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/900,955

(22) PCT Filed: Jun. 19, 2014

(86) PCT No.: PCT/EP2014/062927
§ 371 (c)(1),
(2) Date: Dec. 22, 2015

(87) PCT Pub. No.: WO2014/206854
PCT Pub. Date: Dec. 31, 2014

(65) Prior Publication Data
US 2016/0152747 A1    Jun. 2, 2016

(30) Foreign Application Priority Data
Jun. 25, 2013  (EP) .................................... 13173535

(51) Int. Cl.
*C08F 210/16*    (2006.01)
*C08L 23/08*     (2006.01)
(Continued)

(52) U.S. Cl.
CPC ........ *C08F 210/16* (2013.01); *C08L 23/0815* (2013.01); *B29C 49/0005* (2013.01);
(Continued)

(58) Field of Classification Search
CPC .......................... C08L 23/0815; C08F 210/16
See application file for complete search history.

(56) References Cited

U.S. PATENT DOCUMENTS 4,414,369 A   11/1983  Kuroda et al.
5,106,805 A    4/1992  Bailly et al.
(Continued)

FOREIGN PATENT DOCUMENTS

CN    1867596 A   11/2006
CN    1898274 A    1/2007
(Continued)

OTHER PUBLICATIONS

Seymour/Carraher's Polymer Chemistry, Charles Carraher (ed). 6th ed. Marcel Dekker, 2003, p. 72.*
(Continued)

*Primary Examiner* — Catherine S Branch

(57) ABSTRACT

The present technology relates to a polyethylene composition suitable for producing small articles such as flexible and collapsible tubes by blow molding comprising:
1) a density from 0.948 to 0.955 g/cm$^3$;
2) a MIF/MIP ratio from 12 to 25;
3) a MIF from 25 to 40 g/10 min;
4) a Mz from 1000000 to 2000000 g/mol; and
5) a long-chain branching index, LCBI, equal to or greater than 0.55.

13 Claims, 1 Drawing Sheet

(51) Int. Cl.
*B29C 49/04* (2006.01)
*B29C 49/00* (2006.01)

(52) U.S. Cl.
CPC .... *B29C 2049/047* (2013.01); *B29K 2023/06* (2013.01); *C08L 2205/025* (2013.01)

(56) References Cited

U.S. PATENT DOCUMENTS

| | | |
|---|---|---|
| 5,688,865 A | 11/1997 | Ali et al. |
| 6,034,026 A | 3/2000 | Garoff et al. |
| 7,514,508 B2 | 4/2009 | Meier et al. |
| 7,678,867 B2 | 3/2010 | Baita et al. |
| 9,090,719 B2 | 7/2015 | Berthold et al. |
| 2007/0021295 A1 | 1/2007 | Morini et al. |
| 2007/0093621 A1* | 4/2007 | Meier .................... B01J 8/0055 526/65 |
| 2009/0061135 A1 | 3/2009 | Wang et al. |
| 2014/0243475 A1* | 8/2014 | Mavridis ................ C08L 23/08 525/53 |

FOREIGN PATENT DOCUMENTS

| | | | |
|---|---|---|---|
| CN | 102958951 A | 3/2013 | |
| JP | S5490386 A | 7/1979 | |
| JP | S54100444 A | 8/1979 | |
| JP | H0586122 A | 4/1993 | |
| JP | H10195261 A | 7/1998 | |
| JP | 2006131814 A | 5/2006 | |
| JP | 2006528271 A | 12/2006 | |
| JP | 2007514813 A | 6/2007 | |
| NL | EP 0541760 B1 * | 8/1996 | ............. C08F 10/00 |
| WO | WO-9535323 A1 | 12/1995 | |
| WO | WO2005/058982 A1 | 6/2005 | |
| WO | WO2007/118866 A1 | 10/2007 | |
| WO | WO2010/139419 A2 | 12/2010 | |

OTHER PUBLICATIONS

Shroff and Mavridis, "Long-Chain-Branching Index for Essentially Linear Polyethylenes," Macromolecules 1999, 32, 8454-8464.*
PCT International Search Report & Written Opinion mailed Oct. 6, 2014, for PCT/EP2014/062927.
PCT International Search Report and the Written Opinion—Mailed Oct. 6, 2014 (Oct. 6, 2014) for Corresponding PCT/EP2014/062927.

* cited by examiner

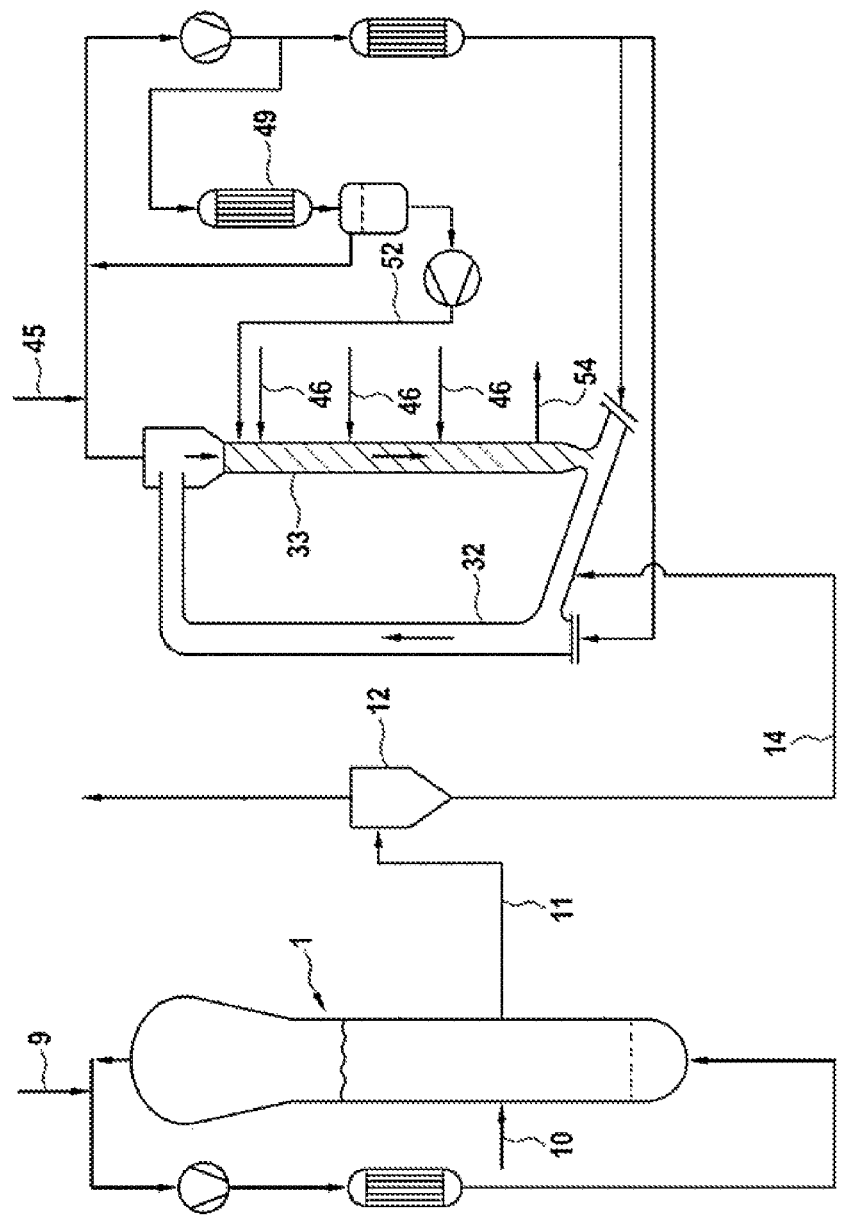

POLYETHYLENE COMPOSITION FOR BLOW MOLDING HAVING HIGH STRESS CRACKING RESISTANCE

This application is the U.S. National Phase of PCT International Application PCT/EP2014/062927, filed Jun. 19, 2014, claiming benefit of priority to European Patent Application No. 13173535.9, filed Jun. 25, 2013, the contents of which are incorporated herein by reference in its entirety.

FIELD OF THE INVENTION

The present disclosure relates to a polyethylene composition for producing small articles such as flexible and collapsible tubes by blow molding.

BACKGROUND OF THE INVENTION

Examples of prior art compositions related to polyethylene compositions and processing are disclosed in WO2009003627.

SUMMARY OF THE INVENTION

The present disclosure relates to a polyethylene composition for producing small articles. It has now been found that by properly selecting the molecular weights of the composition, a particularly high Environmental Stress Cracking Resistance (ESCR) is achieved in combination with an extremely smooth surface of the final article, with substantially no gel.

In some embodiments, the polyethylene composition of the present technology can be melt-processed at unusually high shear rate values, high processing speeds and/or reduced melt-processing temperatures, without encountering flow-instabilities which may produce unacceptable defects in the final article (e.g. "shark skins" or melt fractures), even in the absence of processing aids. The present technology also relates to a multi-stage polymerization process for preparing the said polyethylene composition.

In certain embodiments, the present disclosure provides for a polyethylene composition comprising:

1) a density from 0.948 to 0.955 g/cm$^3$, including from 0.949 to 0.954 g/cm$^3$, as determined according to ISO 1183 at 23° C.;
2) a MIF/MIP ratio from 12 to 25, including from 15 to 23, where MIF is the melt flow index at 190° C. with a load of 21.60 kg, and MIP is the melt flow index at 190° C. with a load of 5 kilograms (kg), both determined according to ISO 1133;
3) MIF from 25 to 40 g/10 minutes (min), including from 30 to 35 g/10 min and from 31 to 35 g/10 min;
4) Mz from 1000000 to 2000000 g/mol, in particular from 1100000 to 2000000 g/mol, such as from 1000000 to 1500000 g/mol, from 1100000 to 1500000 g/mol, from 1000000 to 1450000 g/mol, from 1100000 to 1450000 g/mol, from 1000000 to 1400000 g/mol and from 1100000 to 1400000 g/mol;
5) a long-chain branching index, LCBI, equal to or greater than 0.55, including equal to or greater than 0.60; wherein LCBI is the ratio of the measured mean-square radius of gyration $R_g$, measured by GPC-MALLS, to the mean-square radius of gyration for a linear PE having the same molecular weight.

In addition to features 1) to 5), the polyethylene composition of the technology may further comprise:

6) eta (0.02) from 25,000 to 35,000 Pascal·seconds (Pa·s), preferably from 28,000 to 33,000 Pa·s; wherein eta (0.02) is the complex shear viscosity at an angular frequency of 0.02 rad/s, measured with dynamic oscillatory shear in a plate-plate rotational rheometer at a temperature of 190° C.

BRIEF DESCRIPTION OF THE DRAWINGS

These and other features, aspects, and advantages of the present disclosure will become better understood with reference to the following description and appended claims, and accompanying drawing FIGURES where:

The FIGURE is illustrative of a process-flow diagram of two serially connected gas-phase reactors for ethylene polymerization processes in accordance with some embodiments of the present disclosure.

It should be understood that the various embodiments are not limited to the arrangements and instrumentality shown in the drawing FIGURES.

DETAILED DESCRIPTION OF THE INVENTION

The term "polyethylene composition" refers to both a single ethylene polymer and an ethylene polymer composition, in particular a composition of two or more ethylene polymer components, including with different molecular weights, being also called "bimodal" or "multimodal" polymer in the relevant art.

The polyethylene composition of the present technology, in some embodiments, comprises one or more ethylene copolymers. The ratio MIF/MIP provides a rheological measure of molecular weight distribution. Another measure of the molecular weight distribution is provided by the ratio Mw/Mn, where Mw is the weight average molar mass and Mn is the number average molar mass, both measured by GPC (gel permeation chromatography). In some embodiments, Mw/Mn values for the polyethylene composition of the present technology may range from 15 to 30, including from 20 to 30.

Moreover the polyethylene compositions of the present disclosure may comprise at least one of the following additional features:

Mw equal to or lower than 300000 g/mol, including equal to or lower than 250000 g/mol and from 250000 to 180000 g/mol;

MIP from 1.0-2.5 g/10 min, including from 1.5-2.5 g/10 min

A comonomer content from 1 to 3% by weight, including from 1.2 to 2.5% by weight, of the composition.

The comonomer or comonomers present in the ethylene copolymers may be selected from olefins having the general formula $CH_2=CHR$, where R is an alkyl radical or a linear or branched compound having from 1 to 10 carbon atoms. Examples include propylene, butene-1, pentene-1, 4-methylpentene-1, hexene-1, octene-1 and decene-1.

In some embodiments, the composition comprises:
A) 40-60% by weight of an ethylene homopolymer or copolymer (the homopolymer being preferred) with a density equal to or greater than 0.960 g/cm$^3$ and a melt flow index (MIE) at 190° C. with a load of 2.16 kg, according to ISO 1133, of 20-120 g/10 min;
B) 40-60% by weight of an ethylene copolymer having a MIE value lower than the MIE value of A), including lower than 0.5 g/10 min.

The above percent amounts are given with respect to the total weight of A)+B). The amount of comonomer in B) is, in certain embodiments, from 1.5 to 5% by weight with respect to the total weight of B). The polyethylene compositions described herein can be advantageously used for producing small articles, such as flexible and collapsible tubes, by blow molding. In certain embodiments, the small articles may be characterized by the following non-limiting properties:

Environmental stress cracking resistance as measured by FNCT 4 MPa/80° C.: Greater than 35 h;
Swell ratio: Greater than 175%;
Tensile Notch Impact (T=−30° C.): 70 kJ/m² or higher;
A substantial absence of gels.

The details of the test methods are given in the Examples section. In some embodiments, the polyethylene composition of the present disclosure is used for the production of small blow moldings in the blow-molding process by first plastifying the polyethylene molding composition in an extruder at temperatures from 180 to 250° C. and then extruding the composition through a die into a blow mold, where it is cooled. In non-limiting examples, the blow moldings may have a capacity from 250 to 5000 ml. The polyethylene compositions of the present disclosure may further be melt-processed at surprisingly high values of shear rate without undergoing problematic pressure oscillations and flow instabilities.

In certain embodiments, the polyethylene compositions of the present technology have a SIC Index value of 1.5 to 3, including from 2 to 2.4, where the SIC Index is the Shear-Induced Crystallization Index, determined according to the following relation:

$$\text{SIC Index} = (t_{onset,SIC}@1000 \times t_{onset,quiescent})/(\text{MIF})$$

where $t_{onset,SIC}@1000$ is measured in seconds and is the time required for a crystallization onset under a shear rate of 1000 s$^{-1}$, the $t_{onset,quiescent}$ is measured in seconds and is the crystallization onset time at a temperature of 125° C. under no shear, as determined in isothermal mode by differential scanning calorimetry (DSC).

While no limitations on the kind of polymerization processes and catalysts to be used in the present technology are known, in some embodiments the polyethylene compositions of the present disclosure can be prepared by a gas phase polymerization process in the presence of a Ziegler-Natta catalyst.

A Ziegler-Natta catalyst comprises the product of the reaction of an organometallic compound of Group 1, 2 or 13 of the Periodic Table of Elements with a transition metal compound of Groups 4 to 10 of the Periodic Table of Elements. In some embodiments, the transition metal compound can be selected from Ti, V, Zr, Cr and Hf and supported on MgCl$_2$. In certain embodiments, an organometallic compound for use in the present technology may be selected from the organo-Al compounds. The polyethylene composition of the present technology may therefore be produced by using a Ziegler-Natta polymerization catalyst supported on MgCl$_2$ comprising the product of reaction of:
a) a solid catalyst component comprising a Ti compound and an electron donor compound ED supported on MgCl$_2$;
b) an organo-Al compound; and optionally
c) an external electron donor compound ED$_{ext}$.

In certain embodiments, in component a) the ED/Ti molar ratio ranges from 1.5 to 3.5 and the Mg/Ti molar ratio is higher than 5.5, such as from 6 to 80.

Titanium compounds for use in the present technology include the tetrahalides or the compounds of formula TiX$_n$ (OR$^1$)$_{4-n}$, where 0≤n≤3, X is halogen, including chlorine, and R$^1$ is a C$_1$-C$_{10}$ hydrocarbon group. The ED compound may be selected from alcohols, ketones, amines, amides, nitriles, alkoxysilanes, aliphatic ethers, and esters of aliphatic carboxylic acids. Examples of esters for use in the present technology are the alkyl esters of C1-C20 aliphatic carboxylic acids, such as C1-C8 alkyl esters of aliphatic mono carboxylic acids such as ethyl acetate, methyl formate, ethyl formate, methyl acetate, propyl acetate, i-propyl acetate, n-butyl acetate and i-butyl acetate. Moreover, aliphatic ethers such as C2-C20 aliphatic ethers, including tetrahydrofuran (THF) or dioxane, may be used.

In certain embodiments, in the solid catalyst component the MgCl$_2$ is the basic support. Additionally, minor amount of additional carriers can be used. The MgCl$_2$ can be used in commercially available form or obtained from Mg compounds used as precursors that can be transformed into MgCl$_2$ by reaction with halogenating compounds. U.S. Pat. Nos. 4,298,718 and 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the ASTM-card reference of the spectrum of the non-active halide is diminished in intensity and broadened. In the X-ray spectra of magnesium dihalides in active form, the most intense line is diminished in intensity and replaced by a halo whose maximum intensity is displaced towards lower angles relative to that of the most intense line.

In some embodiments, the preparation of the polyethylene composition of the present technology includes catalysts where the solid catalyst component a) is obtained by first contacting the titanium compound with the MgCl$_2$, or a precursor Mg compound, optionally in the presence of an inert medium, producing an intermediate product a') containing a titanium compound supported on MgCl$_2$. The intermediate product a') is then contacted with the electron donating (ED) compound, which is added to the reaction mixture alone or in a mixture with other compounds in which it represents the main component, optionally in the presence of an inert medium.

The term "main component" refers to a process in which the ED compound must predominate in terms of molar amount, with respect to the other possible compounds excluding inert solvents or diluents used to handle the contact mixture. The ED treated product can then be subject to washings with solvents in order to recover the final product. If needed, the treatment with the ED compound desired can be repeated one or more times.

As previously mentioned, a precursor of MgCl$_2$ can be used as a starting Mg compound and can be selected from Mg compounds of formula MgR'$_2$, where the R' groups can be independently C1-C20 hydrocarbon groups optionally substituted, OR groups, OCOR groups, chlorine, in which R is a C1-C20 hydrocarbon groups optionally substituted, where the R' groups are not simultaneously chlorine. Also suitable as precursors are the Lewis adducts between MgCl$_2$ and suitable Lewis bases. In a non-limiting embodiment, MgCl$_2$ (R"OH)$_m$ adducts in which R" groups are C1-C20 hydrocarbon groups, such as C1-C10 alkyl groups, and m is from 0.1 to 6, including from 0.5 to 3 and from 0.5 to 2, may be used. Adducts of this type may be obtained by mixing alcohol and MgCl$_2$ in the presence of an inert hydrocarbon immiscible with the adduct and operating under stirring conditions at the melting temperature of the adduct (100-130° C.). The emulsion is quickly quenched, thereby causing the solidification of the adduct in form of spherical particles. Representative methods for the preparation of these spherical adducts are reported in U.S. Pat. Nos. 4,469,648 and 4,399,054, and WIPO Pat. App. Pub. No. WO 1998/44009. Another method for the spherulization of the adduct is the spray cooling method described in U.S. Pat. Nos. 5,100,849 and 4,829,034.

In certain embodiments, $MgCl_2 \cdot (EtOH)_m$ adducts, in which m is from 0.15 to 1.7, may be obtained by treating the adducts with excess alcohol using a thermal dealcoholation process carried out in nitrogen flow at temperatures between 50 and 150° C. as described in EP Pat. Doc. No. 395083. The dealcoholation can also be carried out chemically by contacting the adduct with compounds able to react with the alcohol groups.

The dealcoholated adducts described herein may also characterized by a porosity (measured by mercury method) due to pores with radii up to 0.1 µm and ranging from 0.15 to 2.5 cm$^3$/g, including from 0.25 to 1.5 cm$^3$/g.

It is preferred that the dealcoholation reaction is carried out simultaneously with the step of the reaction involving a titanium compound. Accordingly, these adducts may be reacted with the $TiX_n(OR^1)_{4-n}$ compound (or possibly mixtures thereof) mentioned above, such as titanium tetrachloride ($TiCl_4$). The reaction with the Ti compound can be carried out by suspending the adduct in $TiCl_4$ (under cold conditions), then heated to a temperature ranging from 80-130° C. and kept at this temperature for 0.5-2 hours. The treatment with the titanium compound can be carried out one or more times, including twice. The treatment can also be carried out in the presence of an electron donor compound including those mentioned above. At the end of the process the solid is recovered by separation of the suspension via the conventional methods (such as settling and removing of the liquid, filtration, centrifugation) and can be subject to washings with solvents. Although the washings are typically carried out with inert hydrocarbon liquids, it is also possible to use polar solvents such as halogenated hydrocarbons.

As mentioned above, the intermediate product is then brought into contact with the ED compound under conditions for affixing an effective amount of donor to the solid, which can widely vary. As an example, it can be used in molar ratio with respect to the Ti content in the intermediate product ranging from 0.5 to 20, including from 1 to 10. In some embodiments, the contact may be carried out in a liquid medium such as a liquid hydrocarbon. The temperature at which the contact takes place can vary depending on the nature of the reagents and may be, in certain embodiments, from −10 to 150° C., including from 0 to 120° C. However, temperatures that may cause the decomposition or degradation of any specific reagents should be avoided even if they fall within the generally suitable range.

The treatment time can vary depending on conditions such as the nature of the reagents, temperature, concentration, etc. In some embodiments, the contact step can last from 10 minutes to 10 hours, including from 0.5 to 5 hours and may be repeated one or more times. At the end of this step the solid is recovered by separation of the suspension via conventional methods such as settling and removing of the liquid, filtration, centrifugation, etc., and can be subject to washings with solvents. Although the washings are typically carried out with inert hydrocarbon liquids, it is also possible to use more polar solvents (e.g. those with a higher dielectric constant) such as halogenated or oxygenated hydrocarbons.

As previously mentioned, the solid catalyst component may be converted into catalysts for the polymerization of olefins by reacting it, according to known methods, with an organometallic compound of Group 1, 2 or 13 of the Periodic Table of Elements, including with an Al-alkyl compound.

The alkyl-Al compound may be chosen from among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ with trialkyl aluminum compounds.

The external electron donor compound $ED_{ext}$ may be used to prepare Ziegler-Nana catalysts that are the same or different from the ED used in the solid catalyst component a), such as donors selected from the group consisting of ethers, esters, amines, ketones, nitriles, silanes and mixtures thereof, including C2-C20 aliphatic ethers and cyclic ethers having 3-5 carbon atoms such as tetrahydrofuran and dioxane. Examples of the above described Ziegler-Natta catalysts and methods for their preparation are provided in WIPO Pat. App. Pub. No. WO 2004106388.

The catalyst can be prepolymerized according to known techniques, by producing reduced amounts of polyolefin such as polypropylene or polyethylene. The prepolymerization can be carried out before adding the electron donor compound (ED) by subjecting to prepolymerization the intermediate product a'). Alternatively, it is possible to subject to prepolymerization the solid catalyst component a). In certain embodiments, the amount of prepolymer produced can be up to 500 g per g of intermediate product a') or of component a), including from 0.5 to 20 g per g of intermediate product a').

The prepolymerization process may be carried out with a suitable cocatalyst such as an organoaluminum compound that can also be used in combination with an external electron donor compound as discussed above. It can be carried out at temperatures from 0 to 80° C., including from 5 to 70° C., in the liquid or gas phase. The catalysts used where the intermediate product a') is subjected to prepolymerization as described may be employed.

It has been found that by using the above described polymerization catalyst, the polyethylene composition of the present invention can be prepared in a process comprising the following steps, in any order:
a) polymerizing ethylene, optionally together with one or more comonomers, in a gas-phase reactor in the presence of hydrogen; and
b) copolymerizing ethylene with one or more comonomers in another gas-phase reactor in the presence of an amount of hydrogen less than step a);
where in at least one of the gas-phase reactors the growing polymer particles flow upward through a first polymerization zone (riser), under fast fluidization or transport conditions, leave the riser and enter a second polymerization zone (downcomer) through which they flow downward under the action of gravity, leave the downcomer and are reintroduced into the riser, thus establishing a circulation of polymer between the two polymerization zones.

In the first polymerization zone (riser), fast fluidization conditions are established by feeding a gas mixture comprising one or more olefins (e.g. ethylene and comonomers) at a velocity higher than the transport velocity of the polymer particles. The velocity of the gas mixture may be between 0.5 and 15 m/s, including between 0.8 and 5 m/s. The terms "transport velocity" and "fast fluidization conditions" are described, for example, in D. Geldart, Gas Fluidization Technology, page 155 et seq., J. Wiley & Sons Ltd., 1986.

In the second polymerization zone (downcomer), the polymer particles flow under the action of gravity in a densified form, so that high values of density of the solid are reached (mass of polymer per volume of reactor), which approach the bulk density of the polymer. The polymer flows vertically down through the downcomer in a plug flow (packed flow mode), so that only small quantities of gas are entrained between the polymer particles. The process allows one to obtain from step a) an ethylene polymer with a molecular weight lower than the ethylene copolymer obtained from step b).

The polymerization of ethylene to produce a relatively low molecular weight ethylene polymer (step a) may be performed upstream of the copolymerization of ethylene with a comonomer to produce a relatively high molecular weight ethylene copolymer (step b). For instance, in step a) a gaseous mixture comprising ethylene, hydrogen and an inert gas is fed to a first gas-phase reactor such as a gas-phase fluidized bed reactor. The polymerization may be carried out in the presence of a Ziegler-Natta catalyst, where no comonomer is fed to the first gas phase reactor and a highly crystalline ethylene homopolymer is obtained in step a). However, in certain embodiments a minimal amount of comonomer may be fed so long as the degree of copolymerization in step a) is limited so that the density of the ethylene polymer obtained in step a) is not less than 0.960 g/cm$^3$.

In certain embodiments, hydrogen is fed into the process in an amount depending on the specific catalyst used under conditions to obtain in step a) an ethylene polymer with a melt flow index (MIE) from 20-120 g/10 min. In order to obtain the above MIE range, in step a) the hydrogen/ethylene molar ratio is, in certain embodiments, from 1.5 to 3, the amount of ethylene monomer is 6 to 20% by volume, such as from 10 to 15% by volume, based on the total volume of gas present in the polymerization reactor. The remaining portion of the feeding mixture is represented by inert gases and optionally one or more comonomers. In some embodiments, inert gases capable of dissipating the heat generated by the polymerization reaction are utilized and selected from nitrogen or saturated hydrocarbons such as propane.

The operating temperature in the reactor of step a) is between 50 and 120° C., such as between 65 and 100° C., while the operating pressure is between 0.5 and 10 MPa, including between 2.0 and 3.5 MPa.

In certain embodiments, the ethylene polymer obtained in step a) represents from 40 to 60% by weight of the total ethylene polymer produced in the overall process, i.e. in the first and second serially connected reactors.

The ethylene polymer coming from step a) and the entrained gas are then passed through a solid/gas separation step, in order to prevent the gaseous mixture coming from the first polymerization reactor from entering the reactor of step b) (second gas-phase polymerization reactor). The gaseous mixture can be recycled back to the first polymerization reactor, while the separated ethylene polymer is fed to the reactor of step b). A suitable point of feeding of the polymer into the second reactor is at the connecting part between the downcomer and the riser, where the solid concentration is particularly low, so that the flow conditions are not negatively affected.

In some embodiments, the operating temperature in step b) is in the range of 65 to 95° C., and the pressure is in the range of 1.5 to 4.0 MPa. The second gas-phase reactor is aimed to produce a relatively high molecular weight ethylene copolymer by copolymerizing ethylene with one or more comonomers. Furthermore, in order to broaden the molecular weight distribution of the final ethylene polymer, the reactor of step b) can be conveniently operated by establishing different conditions of monomers and hydrogen concentration within the riser and the downcomer.

To this purpose, in step b) the gas mixture entraining the polymer particles and coming from the riser can be partially or totally prevented from entering the downcomer for obtaining two different gas composition zones. This can be achieved by feeding a gas and/or liquid mixture into the downcomer through a line placed at a suitable point of the downcomer, such as in the upper part. The gas and/or liquid mixture should have a suitable composition that differs from the gas mixture present in the riser. The flow of the gas and/or liquid mixture can be regulated so that an upward flow of gas counter-current to the flow of the polymer particles is generated, particularly at the top, acting as a barrier to the gas mixture entrained among the polymer particles coming from the riser. In certain embodiments, it may be advantageous to feed a mixture with a low content of hydrogen in order to produce the higher molecular weight polymer fraction in the downcomer. One or more comonomers can be fed to the downcomer of step b), optionally together with ethylene, propane or other inert gases.

In some embodiments, the hydrogen/ethylene molar ratio in the downcomer of step b) is between 0.05 and 0.3, the ethylene concentration being comprised from 1-20%, such as 3-10%, by volume, the comonomer concentration being from 0.5 to 2% by volume, based on the total volume of gas present in the downcomer. The rest is propane or similarly inert gases. Since a very low molar concentration of hydrogen is present in the downcomer, by carrying out the process of the present technology it is possible to bond a relatively high amount of comonomer to the high molecular weight polyethylene fraction.

The polymer particles coming from the downcomer are reintroduced in the riser of step b). Since the polymer particles keep reacting and no more comonomer is fed to the riser, the concentration of said comonomer drops to a range of 0.1 to 1% by volume, based on the total volume of gas present in the riser. In practice, the comonomer content is controlled in order to obtain the desired density of the final polyethylene. In the riser of step b) the hydrogen/ethylene molar ratio is in the range of 0.1 to 0.6 and the ethylene concentration is between 5 and 15% by volume based on the total volume of gas present in said riser. The rest is propane or other inert gases. More details on the polymerization process are provided in WIPO Pat. App. Pub. No. WO 1994/12568.

Apart from the polyethylene, the polyethylene composition of the present technology can comprise additional additives. Such additives are, for example, heat stabilizers, antioxidants, UV absorbers, light stabilizers, metal deactivators, peroxide-decomposing compounds and basic costabilizers in amounts up to 10% by weight, including up to 5% by weight, and also fillers, reinforcing materials, plasticizers, lubricants, emulsifiers, pigments, optical brighteners, flame retardants, antistatics blowing agents, or combinations of these in total amounts of up to 50% by weight, based on the total weight of the mixture.

The following examples are given to illustrate, without limiting, the present technology.

EXAMPLES

Unless differently stated, the following test methods are used to determine the properties reported in the detailed description and in the examples.

Density:

Determined according to ISO 1183 at 23° C.

Molecular Weight Distribution Determination:

The determination of the molar mass distributions and the means Mn, Mw, Mz and Mw/Mn derived therefrom was carried out by high-temperature gel permeation chromatography using a method described in ISO 16014-1, -2, -4 (2003). The specifics according to the mentioned ISO standards are as follows: Solvent: 1,2,4-trichlorobenzene (TCB), temperature of apparatus and solutions: 135° C., concentration detector: PolymerChar (Valencia, Paterna 46980, Spain) IR-4 infrared detector, capable for use with TCB. A WATERS Alliance 2000 equipped with the following precolumn SHODEX UT-G and separation columns, SHODEX UT 806 M (3x) and SHODEX UT 807 (Showa Denko Europe GmbH, Konrad-Zuse-Platz 4, 81829 Muenchen, Germany) connected in series was used. The solvent was vacuum distilled under nitrogen and was stabilized with 0.025% by weight of 2,6-di-tert-butyl-4-methylphenol. The flowrate was 1 ml/min, the injection volume was 500 µl and polymer concentration was in the range of 0.01% to 0.05% w/w. The molecular weight calibration was established by using monodisperse polystyrene (PS) standards from Polymer Laboratories (now Agilent Technologies, Böblingen, Germany) in a range from 580 g/mol to Ser. No. 11/600,000 g/mol and additionally with hexadecane. The calibration curve was then adapted to Polyethylene (PE) by means of the Universal Calibration method (Benoit et al., J. Polymer Sci., Phys. Ed., 5, 753(1967)). The Mark-Houwing parameters used herein were for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. Data recording, calibration and calculation was carried out using NTGPC_Control_V6.02.03 and NTGPC_V6.4.24 (hs GmbH, Hauptstraβe 36, D-55437 Ober-Hilbersheim, Germany) respectively.

Shear-Induced Crystallization Test:

This method is utilized to determine the onset time of shear-induced crystallization (SIC) of the polymer, $t_{onset,SIC}$. Samples are melt-pressed at 200° C. for 4 min under 200 bar of pressure in a lab press to produce 1 mm thick plaques. Disc specimens are cut-out with a diameter of 25 mm and inserted in a plate-plate oscillatory-shear rheometer (Physica MCR 301 rotational rheometer from AntonPaar).

The sample is then molten inside the test-geometry at 190° C. for 4 min, cooled down with ~10K/min to the test temperature, T=125° C., and annealed for 5 min. Consequently, a steady shear under constant shear rate is applied and the shear viscosity is monitored as a function of time. The experiment is repeated, each time applying a different shear rate ranging from 0.05 to 0.5 s$^{-1}$. The onset time for SIC, $t_{onset,SIC}$, is taken at the point where the viscosity has increased at 50% of its steady-state value η at 125° C. The steady-state value is the average of the steady shear melt viscosity measured at the specific temperature.

The plot of log $t_{onset,SIC}$ vs. log shear-rate provides a linear function (of type y=Ax+B) which is extrapolated to a shear rate of 1000 s$^{-1}$ (process-relevant) to determine the value of $t_{onset,SIC}$ at 1000.

The SIC Index is then calculated according to the following relation:

SIC Index=$(t_{onset,SIC}$@1000×$t_{onset,quiescent})$/(MIF):

The $t_{onset,quiescent}$ (in sec) is the crystallization onset at a temperature of 125° C. under quiescent conditions, i.e. no shearing, measured in isothermal mode in a differential-scanning-calorimetry apparatus, DSC, as explained below. MIF is the melt flow index (g/10 min) measured at T=190° C. with a 21.6 kg load, according to ISO 1133, as described in 1) I. Vittorias, *Correlation among structure, processing and product properties*, Würzburger Tage 2010, Wolfgang Kunze TA Instruments, Germany; 2) Wo D L, Tanner R I (2010), *The impact of blue organic and inorganic pigments on the crystallization and rheological properties of isotactic polypropylene*, Rheol. Acta 49, 75; and 3) Derakhshandeh M., Hatzikiriakos S. G., *Flow-induced crystallization of high-density polyethylene: the effects of shear and uniaxial extension*, Rheol. Acta, 51, 315-327, 2012.

Isothermal DSC:

The $t_{onset,quiescent}$, the onset time when no deformation is applied at 125° C., is determined by the iso-DSC (isothermal Differential Scanning calorimetry) method. It is measured at 125° C. in a TA Instruments Q2000 DSC apparatus. The determination of the $t_{onset,quiescent}$ is performed using the commercially available software TA Universal Analysis 2000. The sample preparation and set-up follows the DIN EN ISO 11357-1:2009 and ISO 11357-3:1999.

Complex Shear Viscosity

Measured at angular frequency of 0.02 rad/s and 190° C. as follows.

Samples are melt-pressed for 4 min under 200° C. and 200 bar into plates of 1 mm thickness. Disc specimens of a diameter of 25 mm are stamped and inserted in the rheometer, which is pre-heated at 190° C. The measurement can be performed using any rotational rheometer commercially available. Here the Anton Paar MCR 300 is utilized, with a plate-plate geometry. A so-called frequency-sweep is performed (after 4 min of annealing the sample at the measurement temperature) at T=190° C., under a constant strain-amplitude of 5% and measuring and analyzing the stress response of the material in the range of excitation frequencies ω from 670 to 0.02 rad/s. The standardized basic software is utilized to calculate the rheological properties, i.e. the storage-modulus, G', the loss-modulus, G", the phase lag δ (=arctan(G"/G')) and the complex viscosity, η*, as a function of the applied frequency, namely $\eta^*(\omega)=[G'(\omega)^2+G''(\omega)^2]^{1/2}/\omega$. The value of the latter at an applied frequency ω of 0.02 rad/s is the eta (0.02).

Melt Flow Index:

Determined according to ISO 1133 at 190° C. with the specified load.

Long Chain Branching index (LCBI):

The LCB index corresponds to the branching factor g', measured for a molecular weight of 10$^6$ g/mol. The branching factor g', which allows for the determination of long-chain branches at high Mw, was measured by Gel Permeation Chromatography (GPC) coupled with Multi-Angle Laser-Light Scattering (MALLS). The parameter g' is the ratio of the measured mean square radius of gyration to that of a linear polymer having the same molecular weight. Linear molecules show a g' value of 1, while values less than 1 indicate the presence of LCB. Values of g' as a function of molecular weight, M, were calculated from the equation:

$$g'(M) = <Rg^2>_{sample,M} / <Rg^2>_{linear\ ref,M}$$

where $<Rg^2>$,M is the root-mean-square radius of gyration for the fraction of molecular weight M.

The radius of gyration for each fraction eluted from the GPC (as described above but with a flow-rate of 0.6 ml/min and a column packed with 30 µm particles) is measured by analyzing the light scattering at the different angles. Therefore, from this MALLS setup it is possible to determine the molecular weight M and $<Rg^2>_{sample,M}$ and to define g' at a measured $M=10^6$ g/mol. The $<Rg^2>_{linear\ ref,M}$ is calculated by the established relationship between radius-of-gyration and molecular weight for a linear polymer in solution and confirmed by measuring a linear PE reference with the same apparatus and methodology described.

The protocol is described in the following documents.

Zimm B H, Stockmayer W H (1949) *The dimensions of chain molecules containing branches and rings*. J Chem Phys 17.

Rubinstein M., Colby R H. (2003), *Polymer Physics*, Oxford University Press.

Comonomer Content:

The comonomer content is determined by IR in accordance with ASTM D 6248 98, using a Bruker Tensor 27 FT-IR spectrometer calibrated with a chemometric model for determining ethyl- or butyl-side-chains in PE for butene or hexene as the comonomer, respectively. The result is compared to the estimated comonomer content derived from the mass-balance of the polymerization process and was found to be in agreement.

Swell Ratio:

The swell ratio of the studied polymers is measured utilizing a capillary rheometer (Göttfert Rheotester2000 and Rheograph 25) at T=190° C., equipped with a commercial 30/2/2/20 die (total length=30 mm, active length=2 mm, diameter=2 mm, L/D=2/2 and 20° entrance angle) and an optical device (laser diode from Göttfert) for measuring the extruded strand thickness. The sample is molten in the capillary barrel at 190° C. for 6 min and extruded with a piston velocity corresponding to a resulting shear-rate at the die of 1440 s$^{-1}$. The extrudate is cut (by an automatic cutting device from Göttfert) at a distance of 150 mm from the die-exit at the moment the piston reaches a position of 96 mm from the die-inlet. The extrudate diameter is measured with the laser diode at a distance of 78 mm from the die-exit, as a function of time. The maximum value corresponds to the $D_{extrudate}$. The swell-ratio is determined from the calculation: $SR=(D_{extrudate}-D_{die})100\%/D_{die}$, where $D_{die}$ is the corresponding diameter at the die exit, measured with the laser diode.

Notched Tensile Impact Test:

The tensile-impact strength is determined using ISO 8256:2004 with type 1 double notched specimens according to method A. The test specimens (4×10×80 mm) are cut from a compression molded sheet which has been prepared according ISO 1872-2 requirements (average cooling rate 15 K/min and high pressure during cooling phase). The test specimens are notched on two sides with a 45° V-notch. Depth is 2±0.1 mm and curvature radius on notch dip is 1.0±0.05 mm. The free length between grips is 30±2 mm. Before measurement, all test specimens are conditioned at a constant temperature of −30° C. over a period of 2 to 3 hours. The procedure for measurements of tensile impact strength including energy correction following method A is described in ISO 8256.

Environmental Stress Cracking Resistance According to Full Notch Creep Test (FNCT):

The environmental stress cracking resistance of polymer samples is determined in accordance with ISO 16770 (FNCT) in aqueous surfactant solution. From the polymer sample a compression molded 10 mm thick sheet has been prepared. The bars with squared cross section (10×10×100 mm) are notched using a razor blade on four sides perpendicular to the stress direction. A notching device described in M. Fleissner in Kunststoffe 77, 45 (1987), is used for the sharp notch with a depth of 1.6 mm. The load applied is calculated from tensile force divided by the initial ligament area. Ligament area is the remaining area equal to the total cross-section area of specimen minus the notch area. For an FNCT specimen: 10×10 mm$^2$−4 times the trapezoid notch area=46.24 mm$^2$ (the remaining cross-section for the failure process/crack propagation). The test specimen is loaded with standard conditions as suggested by the ISO 16770 with a constant load of 4 MPa at 80° C. in a 2% (by weight) water solution of non-ionic surfactant ARKOPAL N100. The time required for the rupture of the test specimen is then detected.

Charpy Can:

Fracture toughness is determined by an internal method on test bars measuring 10×10×80 mm which had been sawn out of a compression molded sheet with a thickness of 10 mm. Six of the test bars are notched in the center using a razor blade in the notching device mentioned above for FNCT. The notch depth is 1.6 mm. The measurement is carried out substantially in accordance with the Charpy measurement method in accordance with ISO 179-1, with modified test specimens and modified impact geometry (distance between supports). All test specimens are conditioned to the measurement temperature of −30° C. over a period from 2 to 3 hours. A test specimen is then placed without delay onto the support of a pendulum impact tester in accordance with ISO 179-1. The distance between the supports is 60 mm. The drop of the 2 J hammer is triggered, with the drop angle being set to 160°, the pendulum length set to 225 mm and the impact velocity set to 2.93 m/s. The fracture toughness value is expressed in kJ/m$^2$ and is given by the quotient of the impact energy consumed and the initial cross-sectional area at the notch (can). Only values for complete fracture and hinge fracture can be used here as the basis for a common meaning (see suggestion by ISO 179-1).

Example 1 and Comparative Examples 1 and 2

Process Setup: In Example 1, the process was carried out under continuous conditions in a plant comprising two serially connected gas-phase reactors, as shown in the FIGURE.

Example 1

The solid catalyst component was prepared as described in Example 15 of WO2004106388.

Polymerization:

18 g/h of the prepolymerized solid catalyst component prepared as described above were fed, using 5 kg/h of liquid propane, to a precontacting apparatus, in which triethylaluminum (TEA) was dosed. The weight ratio between aluminum alkyl and solid catalyst component was 3:1. The precontacting step was carried out under stirring at 50° C. with a total residence time of 120 minutes.

The catalyst enters the first gas-phase polymerization reactor 1 of the FIG. via line 10. In the first reactor ethylene was polymerized using $H_2$ as a molecular weight regulator and in the presence of propane as an inert diluent. 40 kg/h of ethylene and 130 g/h of hydrogen were fed to the first reactor via line 9. No comonomer was fed to the first reactor.

The polymerization was carried out at a temperature of 80° C. and at a pressure of 2.9 MPa. The polymer obtained in the first reactor was discontinuously discharged via line 11, separated from the gas into the gas/solid separator 12, and reintroduced into the second gas-phase reactor via line 14. The polymer produced in the first reactor had a melt index MIE of about 80 g/10 min and a density of 0.968 kg/dm³.

The second reactor was operated under polymerization conditions of about 84° C. and a pressure of 2.5 MPa. 10 kg/h of ethylene, 0.5 g/h of hydrogen and 1.8 kg/h of 1-hexene were introduced in the downcomer 33 of the second reactor via line 46. 5 kg/h of propane, 31 kg/h of ethylene and 5 g/h of hydrogen were fed through line 45 into the recycling system.

In order to broaden the molecular weight distribution of the final ethylene polymer, the second reactor was operated by establishing different conditions of monomers and hydrogen concentration within the riser 32 and the downcomer 33. This is achieved by feeding via line 52 330 kg/h of a liquid stream (liquid barrier) into the upper part of the downcomer 33. The liquid stream has a composition different from that of the gas mixture present in the riser. The different concentrations of monomers and hydrogen within the riser, the downcomer of the second reactor and the composition of the liquid barrier are indicated in Table 1. The liquid stream of line 52 comes from the condensation step in the condenser 49, at working conditions of 48° C. and 2.5 MPa, where a part of the recycle stream is cooled and partially condensed. As shown in the FIG. 1, a separating vessel and a pump are placed, in the order, downstream of the condenser 49. The final polymer was discontinuously discharged via line 54.

The polymerization process in the second reactor produced relatively high molecular weight polyethylene fractions. In Table 1 the properties of the final product are specified. It can be seen that the melt index of the final product is decreased as compared to the ethylene resin produced in the first reactor, showing the formation of high molecular weight fractions in the second reactor.

The first reactor produced around 48% by weight (split wt %) of the total amount of the final polyethylene resin produced by both the first and second reactors. At the same time, the obtained polymer is endowed with a relatively broad molecular weight distribution, with a ratio MIF/MIP equal to 19.

Comparative Example 1

The polymer of this comparative example is a Ziegler-Natta polyethylene composition, available on the market with the commercial name Hostalen GF 4750 (Basell).

Comparative Example 2

The polymer of this comparative example is a Cr polyethylene composition available on the market with the commercial name Lupolen 5021DX (Basell).

TABLE 1

|  | Ex. 1 | Comp. 1 | Comp. 2 |
|---|---|---|---|
| Operative conditions first reactor | | | |
| $H_2/C_2H_4$ Molar ratio | 2.1 | — | — |
| $C_2H_4$ % | 11.6 | — | — |
| Split (wt %) | 48/52 | — | — |
| Operative conditions second reactor | | | |
| $H_2/C_2H_4$ Molar ratio riser | 0.26 | — | — |
| $C_2H_4$ % riser | 10.3 | — | — |
| $C_6H_{12}$ % riser | 0.75 | — | — |
| $H_2/C_2H_4$ Molar ratio downcomer | 0.12 | — | — |
| $C_2H_4$ % downcomer | 2 | — | — |
| $C_6H_{12}$ % downcomer | 1 | — | — |
| $H_2/C_2H_4$ Molar ratio barrier | 0.027 | — | — |
| $C_2H_4$ % barrier | 5.9 | — | — |
| $C_6H_{12}$ % barrier | 1.35 | — | — |
| Final Polymer properties | | | |
| MIP [5 kg] (g/10 min.) | 1.8 | 1.45 | 1.07 |
| MIF [21.6 kg] (g/10 min.) | 33.3 | 27.8 | 19.7 |
| MIF/MIP | 18.6 | 19.2 | 18.4 |
| Density (g/cm³) | 0.950 | 0.950 | 0.949 |
| Mw [g/mol] | 224085 | 238487 | 199112 |
| Mz [g/mol] | 1215480 | 3078539 | 1096980 |
| Mw/Mn | 24 | 20.41 | 12.2 |
| LCBI | 0.69 | 0.81 | 0.99 |
| Comonomer content IR [% by weight] | 1.9 ($C_6H_{12}$) | 1.1 ($C_4H_8$) | 1.1 ($C_6H_{12}$) |
| SIC index | 2.2 | — | — |
| Eta (0.02) | 30570 | 56700 | 59800 |
| Swell ratio (%) | 182 | 190 | 227 |
| Tensile Notch Impact T = −30° C. [kJ/m²] | 78 | 79 | 102 |
| Charpy aCN, T = −30° C. [kJ/m²] | 6 | 6 | 6.3 |
| FNCT* 4 MPa/80° C. (hours) | 40 | 6.3 | 5.68 |

Notes:
$C_2H_4$ = ethylene;
$C_4H_8$ = butene;
$C_6H_{12}$ = hexene;
*aqueous solution of 2% Arkopal N100

What is claimed is:

1. A polyethylene composition comprising:
   1) a density from 0.948-0.955 g/cm³ as determined according to ISO 1183 at 23° C.;
   2) an MIF/MIP ratio from 12-25, where MIF is the melt flow index at 190° C. with a load of 21.60 kg, and MIP is the melt flow index at 190° C. with a load of 5 kg, both determined according to ISO 1133;
   3) an MIF from 25-40 g/10 min;
   4) an $M_z$ from 1000000-2000000 g/mol; and
   5) a long-chain branching index (LCBI) equal to or greater than 0.60;
      wherein LCBI is the ratio of the measured mean-square radius of gyration $R_g$, measured by GPC-MALLS, to the mean-square radius of gyration for a linear PE having the same molecular weight.

2. The polyethylene composition of claim 1, further comprising:
   6) an eta (0.02) value from 25,000-35,000 Pa·s;
      wherein eta (0.02) is the complex shear viscosity at an angular frequency of 0.02 rad/s, measured with dynamic oscillatory shear in a plate-plate rotational rheometer at a temperature of 190° C.

3. The polyethylene composition of claim 1, wherein the polyethylene composition comprises one or more ethylene copolymers.

4. The polyethylene composition of claim 3, wherein the polyethylene composition has a comonomer content from 1-3%.

5. The polyethylene composition of claim 1, wherein the polyethylene composition is obtained by using a Ziegler-Natta polymerization catalyst.

6. The polyethylene composition of claim 5, wherein the Ziegler-Natta polymerization catalyst comprises the product of the reaction of:

a) a solid catalyst component comprising a Ti compound supported on MgCl$_2$, said component being obtained by contacting the titanium compound with the MgCl$_2$, or a precursor Mg compound, optionally in the presence of an inert medium, obtaining an intermediate product a'), then subjecting a') to prepolymerization and contact with an electron donor compound;
b) an organo-Al compound; and optionally
c) an external electron donor compound.

7. The polyethylene composition of claim 1, having at least one of the following additional features:
a Mw equal to or lower than 300000 g/mol;
a Mw/Mn from 15-30;
an MIP from 1.0-2.5 g/10 min;
an SIC Index from 1.5-3;
wherein the SIC Index is the Shear-Induced Crystallization Index, determined according to the following equation:

$$\text{SIC Index} = (t_{onset,SIC}@1000 \times t_{onset,quiescent})/(\text{MIF})$$

where $t_{onset,SIC}@1000$ is measured in seconds and is the time required for crystallization onset under shear rate of 1000 s$^{-1}$, the $t_{onset,\ quiescent}$ is measured in seconds and is the crystallization onset time at temperature of 125° C. under no shear, as determined in isothermal mode by differential scanning calorimetry.

8. The polyethylene composition of claim 1, comprising:
A) 40-60% by weight of an ethylene homopolymer or copolymer with density equal to or greater than 0.960 g/cm$^3$ and melt flow index MIE at 190° C. with a load of 2.16 kg, according to ISO 1133, of 20-120 g/10 min;
B) 40-60% by weight of an ethylene copolymer having a MIE value lower than 0.5 g/10 min.

9. A manufactured article comprising the polyethylene composition of claim 1.

10. The manufactured article of claim 9, comprising a blow-molded article having a capacity from 250-5000 ml.

11. A process for preparing the polyethylene composition of claim 1, wherein the process is carried out in the presence of a Ziegler-Natta polymerization catalyst supported on MgCl$_2$.

12. The process of claim 11, comprising:
a) polymerizing ethylene, optionally together with one or more comonomers, in a gas-phase reactor in the presence of hydrogen;
b) copolymerizing ethylene with one or more comonomers in another gas-phase reactor in the presence of an amount of hydrogen less than step a);
where in at least one of the gas-phase reactors the growing polymer particles flow upward through a first polymerization zone under fast fluidization or transport conditions, leave the riser and enter a second polymerization zone through which they flow downward under the action of gravity, leave the second polymerization zone and are reintroduced into the first polymerization zone for establishing a circulation of polymer between said two polymerization zones.

13. The polyethylene composition of claim 1, comprising an M$_z$ from 1000000-1500000 g/mol.

* * * * *

UNITED STATES PATENT AND TRADEMARK OFFICE
CERTIFICATE OF CORRECTION

PATENT NO. : 9,725,541 B2
APPLICATION NO. : 14/900955
DATED : August 8, 2017
INVENTOR(S) : Gerhardus Meier et al.

It is certified that error appears in the above-identified patent and that said Letters Patent is hereby corrected as shown below:

On the Title Page

(57)    Line 7    Delete "Mz" and insert --$M_z$--

In the Specification

| | | |
|---|---|---|
| Column 1 | Line 54 | Delete "Mz" and insert --$M_z$-- |
| Column 2 | Line 37 | Delete "Mw/Mn," and insert --$M_w/M_n$,-- |
| Column 2 | Line 37 | Delete "Mw" and insert --$M_w$-- |
| Column 2 | Line 38 | Delete "Mn" and insert --$M_n$-- |
| Column 2 | Line 40 | Delete "Mw/Mn" and insert --$M_w/M_n$-- |
| Column 2 | Line 46 | Delete "Mw" and insert --$M_w$-- |
| Column 4 | Line 6 | Delete "C1-C20" and insert --$C_1$-$C_{20}$-- |
| Column 4 | Line 7 | Delete "C1-C8" and insert --$C_1$-$C_8$-- |
| Column 4 | Line 11 | Delete "C2-C20" and insert --$C_2$-$C_{20}$-- |
| Column 4 | Line 54 | Delete "C1-C20" and insert --$C_1$-$C_{20}$-- |
| Column 4 | Line 56 | Delete "C1-C20" and insert --$C_1$-$C_{20}$-- |
| Column 4 | Line 60 | Delete "C1-C20" and insert --$C_1$-$C_{20}$-- |
| Column 4 | Line 61 | Delete "C1-C10" and insert --$C_1$-$C_{10}$-- |
| Column 6 | Line 13 | Delete "Ziegler-Nana" and insert --Ziegler-Natta-- |
| Column 6 | Line 18 | Delete "C2-C20" and insert --$C_2$-$C_{20}$-- |
| Column 9 | Line 10 | Delete "Mn, Mw, Mz and Mw/Mn" and insert --$M_n$, $M_w$, $M_z$ and $M_w/M_n$-- |
| Column 9 | Line 31 | Delete "Ser. No. 11/600,000" and insert --11600000-- |
| Column 10 | Line 53 | Delete "Mw," and insert --$M_w$,-- |
| Column 14 | Line 14 | In Table 1, delete "Mw" and insert --$M_w$-- |
| Column 14 | Line 15 | In Table 1, delete "Mz" and insert --$M_z$-- |
| Column 14 | Line 16 | In Table 1, delete "Mw/Mn" and insert --$M_w/M_n$-- |

Signed and Sealed this
Twenty-first Day of January, 2020

Andrei Iancu
*Director of the United States Patent and Trademark Office*

CERTIFICATE OF CORRECTION (continued)
U.S. Pat. No. 9,725,541 B2

In the Claims

| | | |
|---|---|---|
| Column 15 | Line 12 | In Claim 7, delete "Mw" and insert --$M_w$-- |
| Column 15 | Line 13 | In Claim 7, delete "Mw/Mn" and insert --$M_w/M_n$-- |